United States Patent [19]

Klein et al.

[11] Patent Number: 4,734,881

[45] Date of Patent: Mar. 29, 1988

[54] MICROPROCESSOR CONTROLLED SIGNAL DISCRIMINATION CIRCUITRY

[75] Inventors: Theodore D. Klein, Waconia; Michael R. Oran, Chaska, both of Minn.

[73] Assignee: Minnesota Mining and Manufacturing Company, St. Paul, Minn.

[21] Appl. No.: 830,535

[22] Filed: Feb. 18, 1986

[51] Int. Cl.[4] .................... G06F 3/00

[52] U.S. Cl. .................... 364/900

[58] Field of Search ... 364/200 MS File, 900 MS File

[56] References Cited

U.S. PATENT DOCUMENTS 4,524,417 6/1985 Kimoto .................... 364/200

*Primary Examiner*—Raulfe B. Zache

*Attorney, Agent, or Firm*—Donald M. Sell; James A. Smith; Robert L. Marben

[57] ABSTRACT

Circuitry for the validation of repetitive signals including input/output circuitry providing information regarding signals received that is connected to a progammable microprocessor, a read only memory and random access memory. The microprocessor is programmed so the circuitry determines the receipt of an input signal at any one of several signal inputs. When a first signal is received at one of the signal inputs a "lock-out" time interval is provided during which another signal cannot be received at any signal input. This is followed by a "window" time interval during which another input signal can be received at the signal input receiving the first signal. A "lock-out" and a "window" time interval are provided for each signal received at the signal input during a "window" time period at which the first input signal was received. Such signals are counted until a predetermined count is reached thereby establishing the received signals as valid signals. A new count is required is a "window" time interval is provided and a signal is not received at the proper input during such time interval.

5 Claims, 4 Drawing Figures

MICROPROCESSOR CONTROLLED SIGNAL DISCRIMINATION CIRCUITRY

BACKGROUND OF THE INVENTION

1. Field of the Invention

The invention presented herein relates to circuitry for the validation of repetitive signals such as those initiated by an optical energy emitter mounted on a vehicle wherein the circuitry is useful in a traffic signal control system which can be remotely changed from a normal traffic mode of operation to an optical energy emitter mode of operation and, more particularly, to the use of a microprocessor as a part of such circuitry.

2. Description of the Prior Art

U.S. Pat. No. Re. 28,100 discloses a traffic signal remote control system in which a pulsed beam of high intensity light transmitted at a predetermined frequency from an emergency vehicle is detected at a controlled traffic intersection and is used to initiate the operation of circuitry operatively connected to the traffic light signal controller for the intersection so a green light will be provided for the emergency vehicle. Such pulses of light are distinguished from the steady state ambient light by the use of a detector which responds only to light pulses which increase in intensity at a very fast rate. The possibility of the system responding to false signals is reduced further by integrating the signals received so a number of the pulses must be received within a short time to provide a signal of sufficient magnitude to cause the remote control system to provide the desired control of the traffic light signal controller.

It was found that the signal discrimination provided by the system described in the above-mentioned patent does not adequately discriminate between a series of equally spaced light pulses and a series of irregularly spaced light pulses. U.S. Pat. No. 4,230,992 discloses a signal discriminating circuit that provides the needed discrimination, but requires the use of a number of discrete, dedicated circuits.

SUMMARY OF THE INVENTION

The invention presented herein provides circuitry for distinguishing signals initiated by an optical energy transmitter mounted on selected vehicles from other signals initiated by other light sources such as fluorescent lights, neon signs, mercury vapor lamp and lightning flashes without using a large number of discrete, dedicated circuit portions.

The invention presented herein provides for circuitry for the validation of repetitive signals supplied to the circuitry which includes a programmable microprocessor connected to input/output circuitry and a read only memory (ROM) for storing instructions for the microprocessor. The input/output circuitry has a plurality of inputs and provides information as to when and which of the inputs receives a signal. The microprocessor is programmed for determining from the input/output circuitry when and at which signal input a first signal is received, controlling the input/output circuitry for preventing the receipt of another signal at any of the signal inputs for a "lock-out" time interval, determining from the input/output circuitry if a signal is received at the signalinput receiving the first signal during a "window" time interval provided immediately following the "lock-out" time interval and establishing subsequent "lock-out" and "window" time intervals during which the same control of the input/output circuitry is provided regarding signals presented to the signal inputs provided a signal is received during the preceding "window" time interval at the signal input where the first signal was received, the first signal being considered valid by said microprocessor if a predetermined number of signals, subsequent to the receipt of the first signal, are received during successive "window" time intervals at the signal input receiving the first signal.

BRIEF DESCRIPTION OF THE DRAWINGS

A better understanding of this invention including its novel features and utility will be obtained upon the consideration of the following detailed description and accompanying drawings wherein:

FIGS. 2 and 3 are arranged for a full showing of the flow chart.

DETAILED DESCRIPTION

Figure 1:
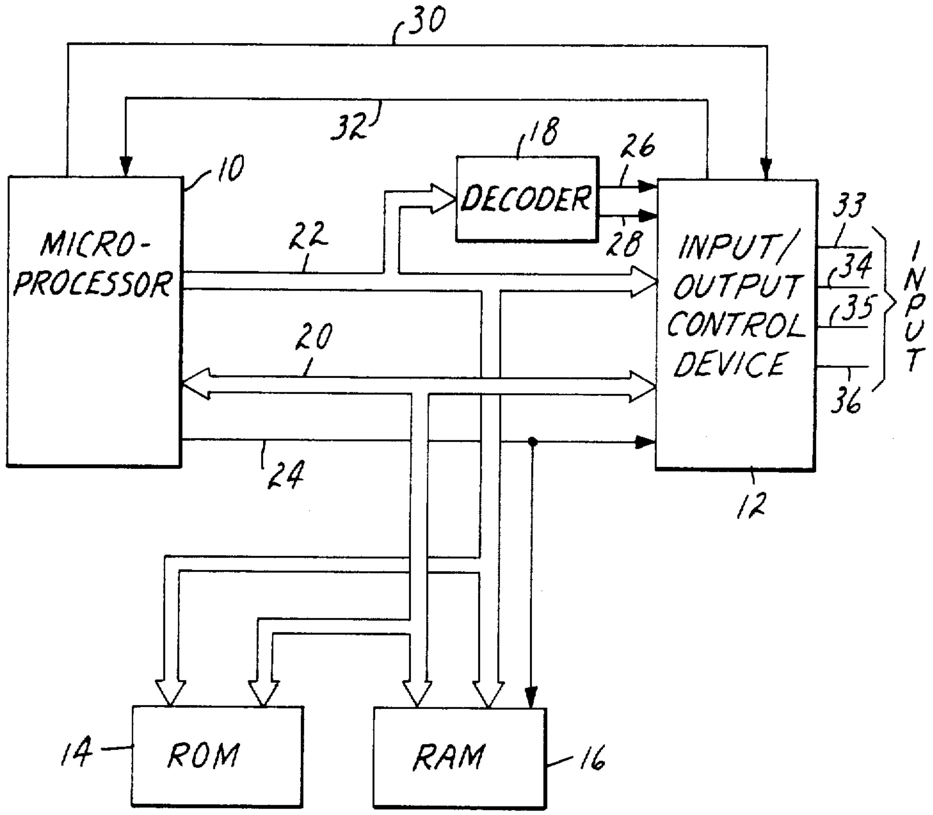
FIG. 1 is a showing in block diagram form of circuitry embodying the invention.
Figure 2:
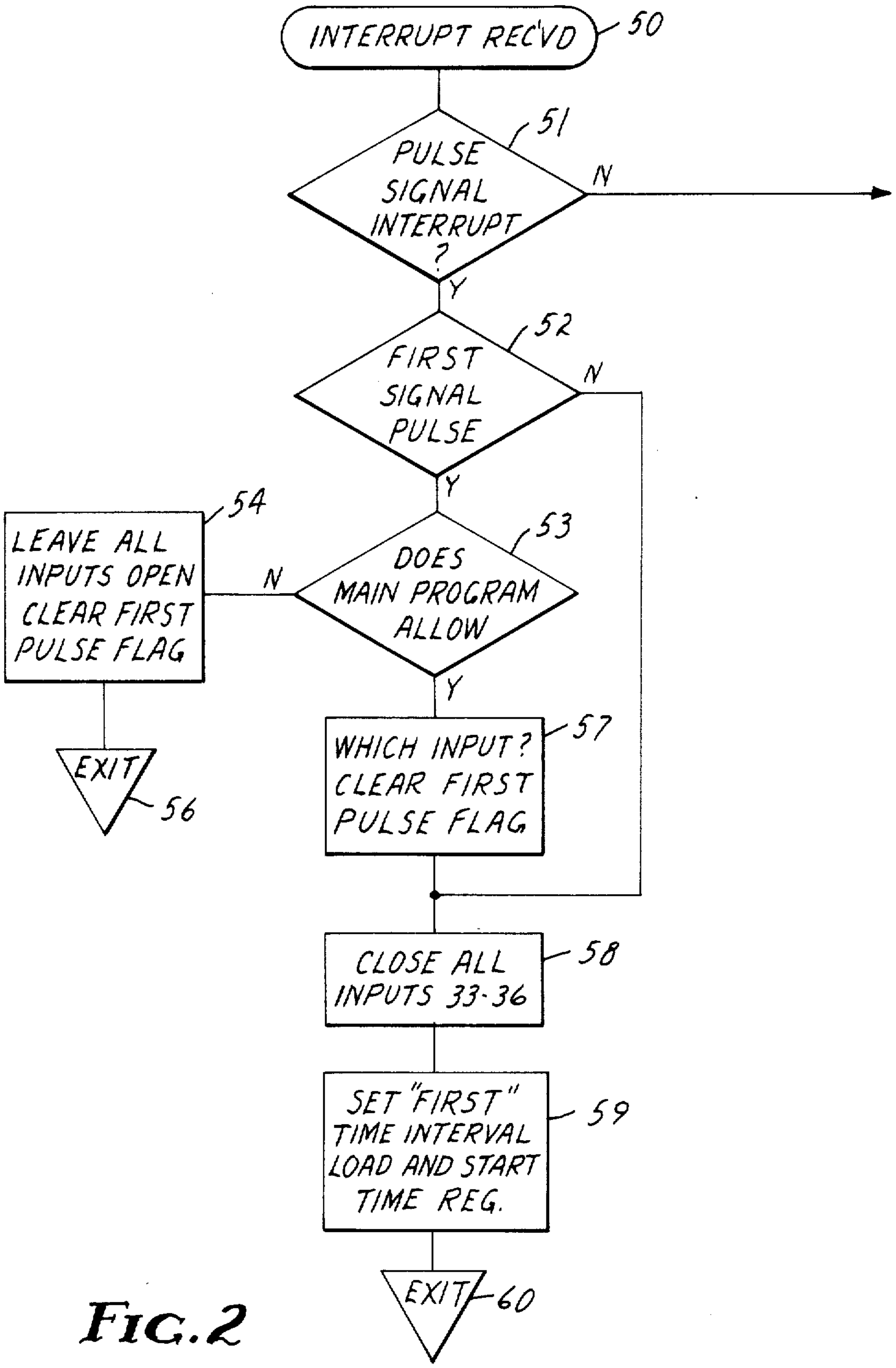
FIGS. 2 and 3 set forth a flow chart for the programming of the microprocessor of FIG. 1 for operation of the circuitry of FIG. 1 in accordance with the invention.
Figures 3, 4:
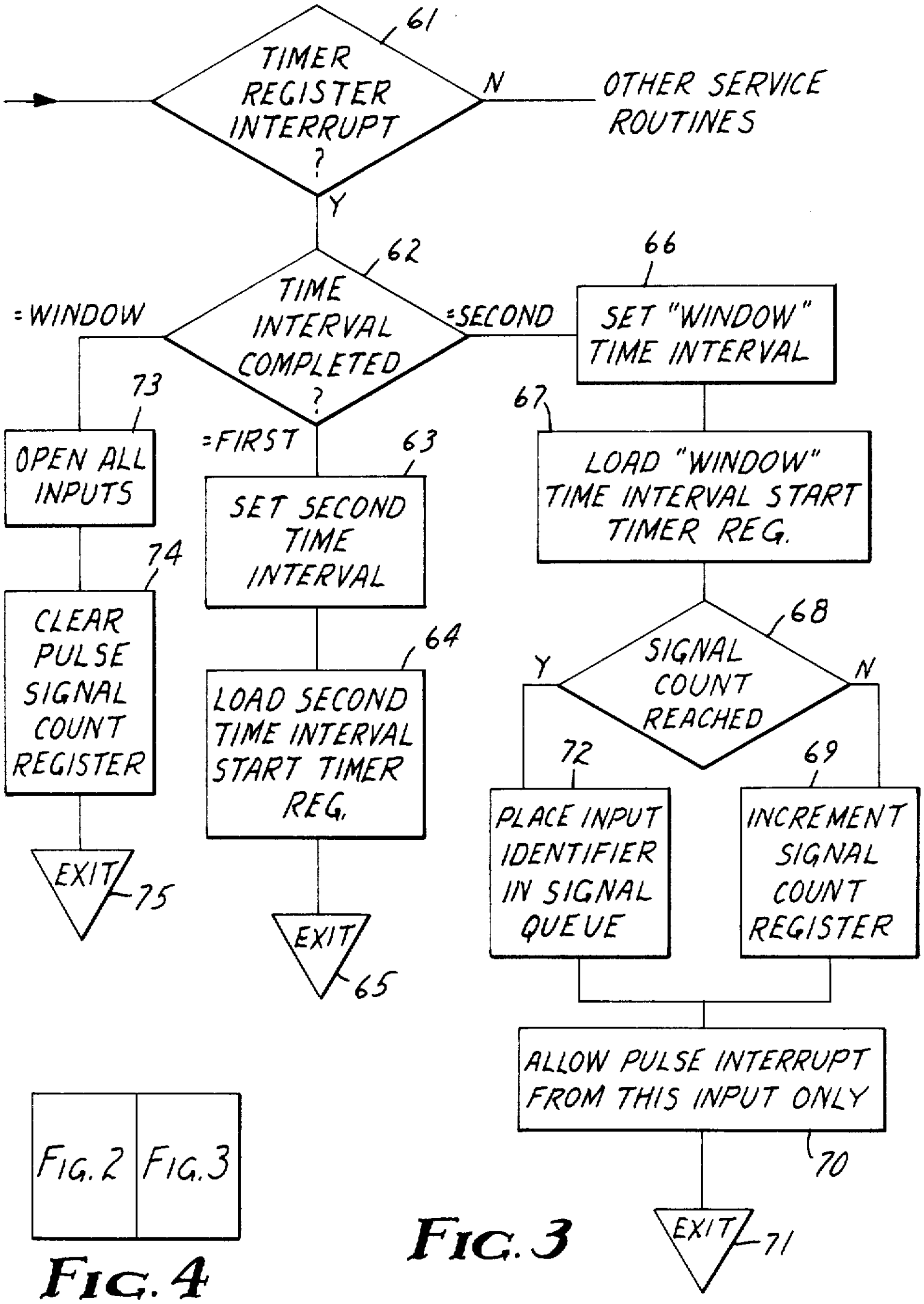
FIG. 4 shows how

The invention presented herein is embodied in the circuitry shown in block diagram form in FIG. 1 wherein the microprocessor 10 of the circuitry of FIG. 1 is programmed in accordance with the flow chart that is set forth in FIGS. 2 and 3. A full showing of the flow chart is obtained when FIGS. 2 and 3 are arranged as shown in FIG. 4. In addition to the microprocessor 10, the circuitry of FIG. 1 includes input/output control circuitry 12, a read only memory (ROM) 14 for microprocessor instructions, a random access memory (RAM) 16 and a decoder 18. The microprocessor 10 is connected via a data bus 20 to each of the circuit portions mentioned, except the decoder 18. In addition, an address bus 22 is provided between the microprocessor 10 and each of the other circuit portions of FIG. 1. A connection 24 is also provided between the microprocessor 10 and the input/output control circuitry 12 as well as the RAM 16 via which the microprocessor 10 can establish the read or write mode of operation, as required, for the circuitry 12 and RAM 16.

Suitable input/output control circuitry 12 can be provided by use of an R65C22 versatile interface adapter that is available from the Rockwell Corporation, 4311 Jamboree Road, P.0. Box CMS 501-300, Newport Beach, Calif. 92658-8902. The circuitry 12 provided by the R65C22 versatile interface adapter includes two chip select inputs which are connected via connections 26 and 28 to receive address signals from the microprocessor 10 via the decoder 18 for addressing various registers that are available in the R65C22. Clock signals from the microprocessor 10 are supplied to the circuitry 12 via the conductor 30. An interrupt signal is supplied from the circuitry 12 to the microprocessor under certain conditions. It is supplied via the conductor 32. The input/output circuitry 12 is used for receiving pulse signals at any of four signal inputs 33-36. The pulse signals of interest are those produced in response to the receipt by circuitry (not shown) of high intensity light transmitted at a predetermined frequency from a light pulse transmitter mounted on a vehicle. It is possible, however, for other pulse signals to be produced in response to various light sources. Each pulse signal that is received by a signal input 33-36, provided the input receiving the signal is open, i.e. free to receive a signal, causes an interrupt signal to be provided to the microprocessor 10.

The circuitry of FIG. 1 functions in response to programming of the microprocessor 10 in accordance with the flow chart or diagram set forth in FIGS. 2 and 3 to determine whether pulse signals received at any one of the signal inputs 33-36 are the result of light transmitted from certain light transmitters. This function is carried out by monitoring all four signal inputs 33-36 for the receipt of a signal pulse initiated by a light pulse and notifying the microprocessor 10 via the interrupt line 32 when the first pulse is received at one of the four signal inputs. The microprocessor 10 then communicates with input/output circuitry 12 to determine which of the signal inputs 33-36 received the pulse signal. The validation of signals received at any of the signal inputs 33-36 is based on the fact that a valid source for the light initiated pulses to be detected will produce a series of equally spaced pulses at a known frequency. When a first pulse signal has been received, the microprocessor 10 provides for the closure of the signal inputs 33-36 for a "lock-out" time interval using a timer register that is provided as a part of the input/output circuitry 12. The "lock-out" time interval established is equal to the minimum time interval expected between successive pulses produced by a valid source. This time interval for closure of the signal inputs 33-36 serves to preclude recognition of the receipt of any pulse signal during such "lock-out" time interval that may have been initiated by an invalid optical signal source. Upon termination of this "lock-out" time interval, another time interval, which is much shorter, is provided. This interval together with the "lock-out" time interval equals the maximum time that is expected between successive pulse signals from a valid source. It is during this short time interval or "window" time interval that a pulse signal should be received from a valid source at the same input as the first pulse signal is received. When the "window" time interval is established, the input at which the first pulse signal was received is opened for the "window" time interval. A "lock-out" time interval followed by a "window" time interval is established each time a pulse signal is received during the preceding "window" time interval. If a predetermined number of pulse signals are received during successive "window" time intervals at the input at which the first pulse signal was received, the pulse signals are considered valid. A count is kept in a pulse signal count register established in the RAM 16. Once the predetermined number of pulse signals are received, this occurrence and identification of the input receiving the pulse signals is placed in an pulse signal queue register established in the RAM 16. In the event a pulse signal is not received as expected during a "window" time interval, the pulse signal count register is cleared and all signal inputs 33-36 are opened to await the receipt of a "First" pulse signal at one of the signal inputs 33-36 with foregoing validation functions carried out once again.

FIGS. 2 and 3 set forth a flow chart for the programming of the microprocessor 10 in conjunction with the other circuitry of FIG. 1 to establish the signal validation or discrimination functions that have been discussed. FIG. 4 shows how FIGS. 2 and 3 are arranged to provide a full showing of the flow chart. The description that follows is provided with reference to the flow chart.

Assuming the first of a series of pulse signals is received at one of the signal inputs 33-36 of the input/output circuitry 12, an interrupt signal is supplied via the interrupt connection 32 to the microprocessor 10, as indicated at 50 in the flow chart. As indicated at 51, the microprocessor 10 is required to determine whether it was an interrupt from the input/output circuitry 12 due to the receipt of a pulse signal at one of the signal inputs 33-36. The input/output circuitry 12 includes two registers wherein one register is an enable register which determines whether stages in the other register, hereinafter referred to as the pulse signal register, can be set and latched. The pulse signal register has a stage for each of the signal inputs 33-36. If a stage is enabled, it is set and latched when the input for the stage receives a pulse signal. The microprocessor 10 establishes a primary input control register in the RAM 16. This register has a stage for each of the signal inputs 33-36 and is used to store information regarding which of the stages for signal inputs 33-36 in the pulse signal register of the circuitry 12 are enabled. It also has a flag stage that indicates whether a pulse signal for a signal input is the first pulse signal supplied to such input. The microprocessor 10 also establishes a secondary input control register in the RAM 16 which also has a stage corresponding to each of the signal inputs 33-36. This secondary input control register is provided since the program for the pulse signal validation or discrimination routine is not the main program used by the microprocessor so a mechanism is needed to allow the main program to prevail over the pulse signal discrimination routine. The main program conditions the secondary input control register to provide an indication to the pulse signal discrimination routine as to which of the signal inputs 33-36 can provide for a service request that will be accepted. Referring again to the flow chart, since the interrupt signal is determined to be a pulse signal interrupt, step 52 is reached where the microprocessor determines whether the pulse signal received was the first pulse signal. Since it is the first pulse signal, a determination is then made at step 53 as to whether the main program will allow the pulse signal discrimination routine to continue. The next step is 54 if the main program will not permit the pulse signal discrimination routine to continue. All inputs are opened at this step to again await the receipt of a pulse signal at one of the inputs, the first pulse flag stage in the pulse signal register in the circuitry 12 is cleared and the routine is exited as indicated at 56. Referring again to step 53, if the microprocessor is allowed to continue the pulse signal discrimination routine, the microprocessor determines from the input/output circuitry 12 which signal input received the pulse signal, enters this information in the primary input control register in the RAM 16 and clears the first pulse flag in the pulse signal register in circuitry 12. The routine then proceeds to step 58 at which point all of the signal inputs 33-36 are closed. They will be closed for a "lock-out" time interval since no pulse signals should occur for such time interval if the first pulse signal was from a valid source. Due to the clock frequency of the microprocessor 10, the selection of the RS65C22 adapter as the input/output circuitry 12 plus the length of the "lock-out" time required for discrimination of pulse signals, a timer register or counter in the RS65C22 must be set twice to provide the necessary "lock-out" time interval when the pulse signals are to occur every 70 milliseconds. The flow chart reflects the two settings of the timer register or counter to establish the "lock-out" time interval, but could be changed readily to reflect a situation wherein only a timer register or counter having sufficient capacity is used to provide such time interval. After closure of all of the signal inputs 33–36, as indicated at 58, the timer register in the input/output circuitry 12 is set for a "First" time interval, which is less than the desired "lock-out" time interval and the timer register is started as indicated at 59. The discrimination routine is then exited at 60 to free the microprocessor for other routines. The completion of the "First" time interval causes an interrupt signal to be supplied to the microprocessor 10 from the timer register that provides the "First" time interval. The query at 51 of the flow chart as to whether the interrupt is an input interrupt must be answered in the negative since all of the signal inputs 33–36 were closed prior to the start of the "First" time interval. As indicated at step 61, the query then is whether the interrupt was from a timer register. If it were not, the microprocessor 10 is free to proceed with whatever service routine gave rise to the interrupt. In this case the interrupt is from the timer register providing the "First" time interval so the next step is 62 where a determination is made as to what time interval has been completed. Since the "First" time interval has been completed, the next step at 63 requires the "Second" time interval to be set, i.e., the additional time interval needed to complete the "lock-out" time interval. This "Second" time interval is loaded in the timer register or counter provided in circuitry 12 and is started as indicated at 64. The routine is then exited as indicated at 65. Upon completion of the "Second" time interval, which completes the "lock-out" time interval, the timer register or counter causes an interrupt signal to be supplied which is subjected to the queries at 51, 61 and 62. Since the answer to the query at 62 is the "Second" time interval, the next step, which is 66, involves setting the "Third" or "window" time interval. The next step is 67 at which time the "window" time interval is loaded into the timer register and started. The microprocessor establishes a pulse signal count register in the RAM 16 for maintaining a current count of the number of consecutive pulse signals received with provision made, as will be discussed, to clear the count to zero if a pulse signal is not received during a "window" time interval. Once the required count is achieved, the count will be frozen so long as consecutive pulse signals are received. Referring again to the flow chart, a query is made at step 68 as to whether the pulse signal count has been achieved. Since only the first pulse signal has been received, the answer is no. This being the case, the pulse signal count register is incremented as indicated at step 69. The microprocessor 10 then communicates with the pulse signal enable register in the circuitry 12 to provide for the initiation of an interrupt in response to pulse signals received at only the input at which the pulse signal just counted was received. This is indicated at step 70. The routine is then exited at 71. This completes a discussion of the flow chart with respect to the routine established in response to receipt of a first pulse signal at one of the signal inputs 33–36.

Per the discussion above, the "Third" or "window" time interval has been started. If a pulse signal is received at the same signal input as the first signal, an interrupt signal will be provided to the microprocessor in view of the action taken at 70 in the flow chart. Receipt of the interrupt signal occurs at step 50 of the flow chart and since it is a pulse signal input interrupt the routine proceeds to step 52 via 51. Since it is not the first pulse signal, the routine is moved by step 52 directly to step 58 which calls for a closure of all of the signal inputs 33–36. Proceeding to step 59, the "First" timing interval for a portion of the "lock-out" time interval is loaded and timer register started. The routine is then existed at 60 and the routine continues from this point in the same manner as has been described in connection with the consideration of the routine with respect to the first pulse signal received. Assuming additional pulse signals are received that are valid pulse signals, a point will be reached where the desired pulse signal count is attained, for example, 22. This will be established at step 68. With the desired pulse signal count achieved, the routine proceeds to the step 72 wherein a register having a stage for each of the signal inputs 33–36 that is established in the RAM 16 is addressed to have the register indicate that valid pulse signals have been received at the input at which the pulse signals were received. This register hereinafter shall be referred to as the pulse signal queue register. The main program of the microprocessor 10 will periodically read this register to determine whether there is a stage in the register that indicates a "call" has been registered so the main program can respond to the "call" or clear the pulse signal queue register forcing the pulse signal discrimination routine to repeat the "call." After the particular input at which the "call" has been received is identified in the pulse signal queue register, the routine proceeds to step 70 where action is taken to permit interrupt signals based on pulse signals received at the signal inputs 33–36 to be provided only from the input that received the pulse signals giving rise to the "call" placed in the pulse signal queue register.

One aspect of the routine set forth in the flow chart that has not been considered is that portion dealing with the failure of the designated input to circuitry 12 to receive a pulse signal before expiration of a "Third" or "window" time interval that is established at various times during the routine that has been discussed. Such failure means the pulse signals input that have been received and are being counted are considered invalid and must be disregarded. If the "Third" or "window" time interval expires without a pulse signal received at the designated input during such time interval, the timer register will provide an interrupt signal to the microprocessor to begin the routine at 50 and as for expirations of the "First" and "Second" time intervals the routine proceeds via steps 51 and 61 to step 62. At step 62 information regarding the time interval that has expired is sought. In this case, it is the "Third" timer interval that has expired so the routine proceeds to step 73 wherein the routine directs the input/output circuitry 12 to allow all pulse signal inputs to receive pulse signals. At step 74 the routine provides for the pulse signal queue register in RAM 16 to be cleared before the routine is exited at step 75.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. Circuitry for the validation of repetitive signals received by the circuitry including:

input/output circuitry having a plurality of signal inputs for receiving signals, said input/output circuitry providing information as to when and which of said signal inputs receives a signal and is controlled by a microprocessor for establishing when and at which of said signal inputs a signal can be received;

programmable microprocessor connected to said input/output circuitry;

a random access memory connectd to said input/output circuitry and said programmable microprocessor;

a read only memory connected to said programmable microprocessor for storing instructions for said programmable microprocessor;

said programmable microprocessor programmed for operating with said input/output circuitry and said random access memory for controlling said input/output circuitry for permitting any of said signal inputs to receive a signal and when a signal is received at one of said signal inputs providing a "lock-out" time interval during which none of said signal inputs can receive a signal and upon completion of said lock-out time interval establishing a "window" time interval during which a signal can be received only at said one of said signal inputs, said "lock-out" and "window" time intervals being provided each time a signal is received at said one of said signal inputs permitting any of said signal inputs to receive a signal in the event a signal is not received during a "window" time interval, a signal received to establish said one of said signal inputs being considered valid by said programmable microprocessor when a predetermined number of signals are received at said one of said inputs before a "window" interval is provided during which a signal is not received at said one of said inputs.

2. Circuitry according to claim 1 wherein said programmable microprocessor is programmed with exits provided at various points.

3. Circuitry according to claim 1 wherein said input/output circuitry provides a pulse signal interrupt to said programmable microprocessor in response to a signal received at one of said signal inputs when any of said inputs are permitted to receive a signal which may or may not initiate operation of said programmable whether said signal received at said one signal input is valid.

4. Circuitry according to claim 1 wherein said programmable microprocessor is programmed for operating said input/output circuitry and said random access memory for providing a count of a signal received at one of said signal inputs when any of said signal inputs are permitted to receive a signal and subsequent signals received during a "window" time interval at said one signal input until a predetermined count is reached.

5. Circuitry according to claim 4 wherein said programmable microprocessor is programmed so that when said predetermined count is reached only an input signal received at said one signal input will cause said input/output circuitry to provide a pulse signal interrupt to said programmable microprocessor.

* * * * *

UNITED STATES PATENT AND TRADEMARK OFFICE
CERTIFICATE OF CORRECTION

PATENT NO. : 4,734,881

DATED : March 29, 1988

INVENTOR(S) : Theodore D. Klein and Michael R. Oran

It is certified that error appears in the above-identified patent and that said Letters Patent is hereby corrected as shown below:

Column 7, line 7, "connected" is misspelled.

Column 8, line 13, after "programmable" insert --microprocessor for determining--.

Signed and Sealed this

Twenty-seventh Day of September, 1988

*Attest:*

DONALD J. QUIGG

*Attesting Officer*

*Commissioner of Patents and Trademarks*